United States Patent Office 3,336,155
Patented Aug. 15, 1967

3,336,155
PROCESS OF COATING PARTICLES
WITH A POLYMER
Englebert L. Rowe, Portage Township, Kalamazoo County, Mich., assignor to The National Cash Register Company, Dayton, Ohio, a corporation of Maryland
No Drawing. Filed Jan. 15, 1964, Ser. No. 337,710
2 Claims. (Cl. 117—100)

This invention relates to an improved coating process, more particularly an improvement in processes of coating particles with a liquid phase of a polymer in nonaqueous solvent systems.

Liquid and solid particles are susceptible to coating with polymers separated from an organic solvent solution thereof. An organic solvent solution of the polymer is prepared, the particles are uniformly dispersed therein, and an organic nonsolvent for the polymer and particles is added to the dispersion. A polymer-rich liquid phase separates during addition of the nonsolvent and coats the dispersed particles. Difficulties have been encountered in successfully carrying out the process in that complete recovery of the coated particles in discrete forms is often impossible because of their adhesion and coalescence. Failing complete recovery, costs are increased. Moreover, adhesion and coalescence result in a lack of uniformity in coated particles that are recovered. Such lack of uniformity hinders successful utilization of the coated particles, for example, in preparation of the coated particles into unitary dosage forms of therapeutic ingredients and into paper or film coatings for pressure release.

It has now been found that incorporation of a mineral silicate into the phase separation system during the addition of the nonsolvent minimizes the deleterious adhesion and coalescence. Hence, the present invention provides an improved process of coating particles with a polymer by liquid phase separation in an organic solvent system wherein the addition of a mineral silicate minimizes adhesion and coalescence of the coated particles and enhances recovery thereof.

In the specification and claims hereof the term liquid phase-forming polymer means polymers and mixtures thereof which form polymer-rich and polymer-poor phases upon addition of an organic nonsolvent for the polymer to an organic solvent solution of the polymer. Formation of the phases is manifested by the appearance of a persistent turbidity during the addition of the nonsolvent. The concentrations of the various polymers in the solvents and the required amounts of the nonsolvents to separate the liquid phase are thus readily determined in the absence of the particles to be coated. The appropriate concentrations are thereafter used in the presence of the liquid or solid particles. The phase-forming polymers are homopolymers and copolymers such as natural and synthetic rubber; cellulose derivatives, for example, ethyl cellulose, cellulose nitrate, benzyl cellulose, cellulose acetate, and cellulose acetate butyrate; styrene-type polymers, for example, polystyrene and styrene-maleic acid copolymer; polyethylene; polypropylene; polybutylene; ethylene types, for example, polyvinyl acetate, polyvinyl chloride, polyvinyl fluoride; and the like.

Liquid organic solvents operable in the inventive process are chlorinated hydrocarbons, for example, methylene chloride and trichloroethylene; aromatic solvents, for example, benzene, xylene, and toluene; ketones, for example, methyl ethyl ketone; alcohols, for example, ethanol.

Operable liquid organic nonsolvents are petroleum distillates, for example, petroleum ether and n-hexane; aliphatic solvents, for example, cyclohexane; alcohols, for example, ethanol and propanol; liquid polymers, for example, liquid polybutadiene; isopropyl ether; and the like.

The solvents and nonsolvents must be miscible with each other and inert to the liquid and solid particles to be coated.

Illustrative polymers and solvent-nonsolvent systems are:

| Polymer | Solvent | Nonsolvent |
|---|---|---|
| Polyvinyl acetate | Methyl ethyl ketone | n-Hexane. |
| Polyvinyl acetate-Cellulose acetobutyrate. | do | Isopropyl ether. |
| Styrene-maleic acid copolymer. | Ethanol | Do. |
| Benzyl cellulose | Trichloroethylene | Propanol. |
| Styrene-maleic acid copolymer. | Ethanol | Ethyl acetate. |
| Ethyl cellulose | Xylene-ethanol | n-Hexane. |
| Polyethylene | Xylene | Ethanol. |
| Natural Rubber | Benzene | Methanol. |
| Polyvinyl acetate | Chloroform | Isopropanol. |
| Ethyl cellulose | Toluene-ethanol | Polybutadiene. |
| Do | Xylene-Carbon tetrachloride. | Petroleum ether. |
| Polystyrene | Xylene | Do. |
| Ethyl cellulose | Toluene | Do. |
| Polystyrene | Xylene | Cyclohexane. |

As aforesaid, both solid and liquid particles are susceptible of coating in the miscible solvent systems. The solid particles, preferably micronized, include pharmaceutical compounds, for example, methylprednisolone, tolbutamide sodium, thiamine mononitrate, and methscopolamine bromide; dyes, for example, amaranth, alizarine cyanine dye; fertilizers, for example, dibasic calcium phosphate and ammonium nitrate; weed toxicants, for example, sodium (2,4-dichlorophenoxy)acetate. The solid particles are substantially insoluble in the miscible solvents and nonsolvents. The liquid particles or droplets include solutions and dispersions in a polar solvent such as water, dilute acid or alkali, and the like. The liquid particles or droplets are also substantially insoluble in the miscible mixture of the solvents and nonsolvents. Such particles and droplets include water, dilute acid and dilute alkali solutions and dispersions of dyes, reagents, pharmaceutical compounds, fertilizers, adhesives, and developers, for example, amaranth, alizarine-cyanine, trisodium phosphate, phloroglucinol dihydrate, urea, zinc chloride, p-diazodimethylaniline-zinc chloride double salt, ammonium nitrate, sodium (2,4-dichlorophenoxy)acetate, thiamine mononitrate, and the like.

The mineral silicate has a particle size of less than about 50 microns. The silicates are those known as bentonite, kaolin, pumice, purified siliceous earth, talc, and the like. Of these silicates talc is preferred.

The preferred weight ratio of mineral silicate to prevent coalescence of the coated particles varies from about 2½ to about 5 parts of mineral silicate to each part of the phase forming polymer. The weight ratio of the polymer to the particles is not critical and can be varied in accordance with the desired thickness of the coating. It has been found that the mineral silicate must be added intermittently as the liquid phase separation occurs, and in this respect the manner of addition is critical. For best results the temperature of the system, although not critical, should be maintained within the range of about 0° to about 25° C. Higher temperatures are less efficient, although operable. It is preferred to induce the phase separation rather quickly once the particles have been dispersed uniformly in the polymer solution. Likewise, it is preferred to recover the coated particles quickly by separation and washing thereof. The particles to be coated must be kept uniformly dispersed during the coating process, and it has been found that a stirring rate of from about 100 to about 300 r.p.m. provides satisfactory results.

The process of the present invention possesses utility in providing coatings that (1) protect the coated liquid or solid particles from oxidative degeneration, (2) prevent contact between incompatible substances in a mixture of ingredients, (3) mask undesirable odors and tastes, (4) provide a barrier to release of the coated liquid or solid particles until the desired pressure is applied to rupture the coat, (5) provide controlled release of the coated material in various media such as the stomach and intestine, (6) provide increased stability of the coated material and (7) permit handling of corrosive and/or irritating materials.

The following examples set forth how to perform the improved process and the best mode contemplated of carrying out the invention but are not to be construed as limiting.

*Example 1*

An ethanol solution of styrene-maleic acid copolymer is prepared to contain 10% by weight of the copolymer.

| | | |
|---|---|---|
| Copolymer solution | mls__ | 22 |
| Isopropyl ether | mls__ | 40 |
| Methylprednisolone | gm__ | 0.5 |
| Talc | gm__ | 11 |

The copolymer solution is stirred, and the isopropyl ether is added dropwise until the first persistent turbidity appears. The methylprednisolone is added. The talc is added intermittently during addition of the remainder of the isopropyl ether. The coated particles do not coalesce and are recovered easily by filtration and washed with isopropyl ether. When dried at room temperature the product is a fine white powder. It demonstrates sustained release of the methylprednisolone in pH 7.5 buffer solution.

*Example 2*

| | | |
|---|---|---|
| 5% solution of polyvinylacetate in methylethyl ketone | ml__ | 40 |
| n-Hexane | ml__ | 28 |
| Methylprednisolone | gm__ | 0.5 |
| Talc | gm__ | 6.1 |

The polymer solution is stirred at ambient temperature and n-hexane is added dropwise to a total of 4.5 ml. The methylprednisolone is then stirred in and n-hexane addition continued to a total of 28 ml., while talc is added intermittently. The coated product is filtered and washed with n-hexane then dried at ambient temperature and pressure. The dried product is ground in a mortar to a white granular powder. The product demonstrates sustained release in buffered fluids.

*Example 3*

A solution of 5 grams of cellulose acetobutyrate is prepared in 100 milliliters of methylethyl ketone at about 65° C. 1.25 grams of dibasic calcium phosphate is dispersed in this solution with adequate stirring to maintain the phosphate compound uniformly mixed. With stirring and with the temperature maintained at about 25° C. isopropyl ether is added. 12.5 gms. of micronized bentonite is added intermittently during addition of the isopropyl ether. When the concentration of the ether reaches about 40%, v./v., a cellulose acetobutyrate-rich phase separates and coats the phosphate compound. Thereafter, the phase coated particles are separated by centrifuging, thoroughly washed with isopropyl ether and allowed to dry. A powder, phase-coated phosphate product is thereby obtained which is suitable for use as a slow release fertilizer.

*Example 4*

A solution of 10 grams of benzyl cellulose is prepared at about 40° C. in 300 milliliters of trichloroethylene and cooled to about 10° C. Eighty grams of sodium (2,4-dichlorophenoxy) acetate is added to this system with adequate stirring. With stirring and with the temperature maintained at about 10° C., propanol is added. 25 gms. of finely powdered kaolin is added intermittently. When the concentration of propanol reaches about 50%, v./v., a benzylcellulose-rich phase separation occurs and the sodium (2,4-dichlorophenoxy)acetate is coated by the separating phase. Thereafter, the phase coated material is separated by centrifuging, thoroughly washed with propanol, and allowed to dry. A powdery benzylcellulose coated substance is obtained which is suitable for use in slow release weed control.

*Example 5*

An ethylcellulose-coated water soluble dye is prepared and liquid phase coated in the following manner:

5 grams of ethylcellulose is dissolved in a mixture of 100 milliliters of xylene and 20 milliliters of ethanol. One-half gm. of alizarine cyanine dye is dispersed in the solution. 125 milliliters of n-hexane (Skellysolve B) is added dropwise to separate an ethylcellulose-rich phase which coats the green dye. Fifteen gms. of purified siliceous earth is added intermittently. The coated dye particles are separated by filtration, washed with n-hexane and vacuum dried.

*Example 6*

A solution of 5 gms. of cellulose acetobutyrate is prepared in 100 milliliters of methylethyl ketone. The coated dye particles of Example 5 are dispersed in this solution at about 20° C. Isopropyl ether is added to a concentration of about 40% causing the separation of a cellulose acetobutyrate-rich phase. Twenty gms. of talc is added intermittently. Said phase forms an additional coat on the ethylcellulose-precoated dye particles. The doubly coated particles are recovered by centrifugation, washed with isopropyl ether, and sprayed onto a paper substrate. Application of pressure to the substrate allows visual indication of dye release.

In lieu of the 5 gms. of cellulose acetobutyrate, a mixture of 2.5 gms. of cellulose acetobutyrate and 2.5 gms. of polyvinyl acetate is used with similiar results.

*Example 7*

Fifteen milliliters of 0.5%, w./v., aqueous solution of amaranth (F. D. and C. No. 2) is added with vigorous agitation to 90 milliliters of a 5.0%, w./v., solution of cellulose acetate butyrate in methylethyl ketone. This mixture is then passed through a hand homogenizer three times. Enough additional butyrate solution is added through the homogenizer to make 150 milliliters of emulsion. An additional 15 milliliters of amaranth solution is added at this time.

To the emulsion system isopropyl ether at about 25° C. is added in small portions with agitation. An increased cloudiness is noted when 100 milliliters have been added. The presence of liquid phase-coated water droplets can be confirmed by microscopic examination.

Therefore, an additional 10 milliliters of isopropyl ether is added with stirring to produce more liquid phase separation. 10 gms. of kaolin is added intermittently. The mixture is allowed to cool slowly without agitation. The coated particles are separated by centrifugation, washed with isopropyl ether and dried in vacuo.

*Example 8*

Part 1.—Aqueous solution:

| | | |
|---|---|---|
| Phloroglucinol dihydrate | gm__ | 0.5 |
| Sodium acetate dihydrate | gm__ | 3.0 |
| Urea | gm__ | 3.0 |
| Polyethylene glycol 400 | gm__ | 20.0 |
| Purified water U.S.P | ml__ | 23.6 |

Part 2.—Polymer solution:

| | | |
|---|---|---|
| Ethyl cellulose | gm__ | 1.25 |
| Xylene | ml__ | 12.5 |
| Carbon tetrachloride | ml__ | 12.5 |

The aqueous solution is dispersed in the polymer solution. Slow addition of petroleum ether and intermittent addition of 6.25 gms. of pumice produce minute ethylcellulose coated capsules of the aqueous solution. The capsules are washed with petroleum ether by decantation and sprayed on a film stratum to provide pressure-rupturable coated film.

*Example 9*

Part 1.—Aqueous solution:
- 4-dimethyl-aminobenzene diazonium chloride-zinc chloride double salt _____ gm__ 7.5
- Zinc chloride _____ gm__ 5.0
- Citric acid _____ gm__ 10.0
- Thiourea _____ gm__ 10.0
- Purified water _____ gm__ 467.5

Part 2.—Polymer solution:
- Ethyl cellulose _____ gm__ 5
- Toluene _____ ml__ 100

The aqueous solution is dispersed in the polymer solution. Slow addition of petroleum ether accompanied by intermittent addition of 12.5 gms. of kaolin causes the polymer to separate as a rich liquid phase which coats the dispersed aqueous particles. The coated particles are washed with more petroleum ether, separated and dried.

What is claimed is:

1. In a process for coating uniformly dispersed particles in an organic solvent solution of a polymer by addition of an organic liquid which is miscible with the solvent and which is a nonsolvent for said particles and said polymer, the improvement comprising intermittent addition, during the addition of said nonsolvent of a mineral silicate having a particle-size of less than 50 microns.

2. The improved process of claim 1 wherein the weight ratio of silicate of polymer ranges from about 2.5 to about 5 parts:1 part.

References Cited

UNITED STATES PATENTS

| | | | |
|---|---|---|---|
| 2,171,765 | 9/1939 | Rohm et al. | 260—89.1 |
| 2,729,598 | 1/1956 | Garbo | 117—100 |
| 3,242,051 | 3/1966 | Hiestand et al. | 167—81 |

WILLIAM D. MARTIN, *Primary Examiner.*

E. J. CABIC, *Assistant Examiner.*

UNITED STATES PATENT OFFICE
CERTIFICATE OF CORRECTION

Patent No. 3,336,155                                           August 15, 1967

Englebert L. Rowe

It is hereby certified that error appears in the above numbered patent requiring correction and that the said Letters Patent should read as corrected below.

Column 6, line 8, for "nonsolvent" read -- nonsolvent, --; line 10, for "of" , second occurrence, read -- to --.

Signed and sealed this 13th day of August 1968.

(SEAL)
Attest:

Edward M. Fletcher, Jr.                                      EDWARD J. BRENNER
Attesting Officer                                                  Commissioner of Patents